United States Patent
Baumert et al.

(10) Patent No.: US 6,846,874 B2
(45) Date of Patent: Jan. 25, 2005

(54) HOT-MELT ADHESIVES BASED ON POLYAMIDE-BLOCK GRAFT COPOLYMERS

(75) Inventors: Martin Baumert, Serquigny (FR); François Court, Paris (FR); Christian Laurichesse, Bernay (FR)

(73) Assignee: Arkema, Cedex (FR)

( * ) Notice: Subject to any disclaimer, the term of this patent is extended or adjusted under 35 U.S.C. 154(b) by 0 days.

(21) Appl. No.: 10/373,201

(22) Filed: Feb. 26, 2003

(65) Prior Publication Data

US 2004/0024127 A1 Feb. 5, 2004

(30) Foreign Application Priority Data

Feb. 26, 2002 (FR) .............................. 02 02394

(51) Int. Cl.⁷ .............................. C08L 77/00
(52) U.S. Cl. .................. 524/538; 525/54.4; 525/63; 525/69; 525/179
(58) Field of Search ............... 525/63, 69, 179, 525/54.4, 66; 524/538, 504

(56) References Cited

U.S. PATENT DOCUMENTS 5,342,886 A * 8/1994 Glotin et al. ................. 525/66
5,843,577 A * 12/1998 Ouhadi et al. ........... 428/474.7
6,310,127 B1   10/2001 Jablon

FOREIGN PATENT DOCUMENTS

WO           00 09607        2/2000
WO           00 58403        10/2000

\* cited by examiner

*Primary Examiner*—Ana Woodward
(74) *Attorney, Agent, or Firm*—Millen, White, Zelano, Branigan, P.C.

(57) ABSTRACT

The present invention relates to a hot-melt adhesive composition comprising:

20 to 80% of a blend comprising: 50 to 100% of (A), which denotes a polyamide-block graft copolymer consisting of a polyolefin backbone and at least one polyamide graft, 0 to 50% of at least one polymer (B) chosen from polyolefins and polyamides;

80 to 20% of a blend comprising at least one tackifying resin and optionally at least one product chosen from waxes, plasticizers and mineral fillers; in which:

the said graft is attached to the backbone via the residues of an unsaturated monomer (X) chosen from unsaturated carboxylic acids, anhydrides of unsaturated carboxylic acids and unsaturated epoxides;

the residues of the unsaturated monomer (X) are attached to the backbone by grafting or copolymerization from its double bond;

the molar mass $\bar{M}_n$ of the grafts is between 1000 and 5000;

the melting point of the grafts is between 100 and 190° C.; and the MFI of (A) is between 1 and 500 (g/10 mm at 190° C. under a load of 2.16 kg).

23 Claims, No Drawings

HOT-MELT ADHESIVES BASED ON POLYAMIDE-BLOCK GRAFT COPOLYMERS

FIELD OF THE INVENTION

The present invention relates to hot-melt adhesives based on polyamide-block graft copolymers.

Hot-melt adhesives are thermoplastic materials solid at room temperature, which become relatively viscous liquids by heating (at around 180° C.). These liquids are applied to a first substrate which is then covered with a second surface. By cooling, an adhesive bond is obtained between the substrate and the second surface. The open time is the period over which the adhesive, that has been applied to a substrate which is at room temperature, remains tacky, that is to say the time interval during which it is possible to apply the second surface and, by cooling, obtain an adhesive bond between a substrate and the second surface. By exceeding this open time, it is no longer possible to obtain sufficient adhesion between the substrate and the second surface. These adhesives are denoted by the abbreviation HMA (hot-melt adhesives).

Hot-melt adhesives offer only limited resistance to loads at temperature, often only 60–70° C., preventing them from being used in certain applications in fields such as: motor vehicles, buildings, packaging, textiles, wood veneering and top-of-the-range binding. The adhesives of the present invention exhibit higher thermal resistance. The hot-melt adhesive according to the invention can be used in applications in the building, motor-vehicle, packaging, binding and wood fields.

BACKGROUND OF THE INVENTION

Patent U.S. Pat. No. 5,506,296 discloses hot-melt adhesives with improved thermal resistance consisting of moisture-crosslinkable components. This document discloses a hot-melt adhesive composition based on an EVA copolymer (a copolymer of ethylene and vinyl acetate) and on a polyisocyanate, the EVA copolymer being a copolymer having a melt flow index at 190° C. under a load of 2.16 kg of between 100 and 1000 g/10 min and containing, with respect to the weight of the said copolymer: 1) 60 to 90% ethylene; 2) 10 to 40% vinyl acetate; and 3) 5 to 20 meq OH of an unsaturated ethylene termonomer carrying at least one primary hydroxyl functional group per mole, the said composition containing substantially no free hydroxyl functional group. Admittedly, these adhesives have good thermal resistance but it is necessary to wait until the crosslinking has been completed and, in addition, the use of isocyanates may pose toxicity problems. Another drawback is also the pot life of these adhesives, before applying them, which may be greatly reduced if the composition is not protected from moisture.

Patent WO 01/62804 discloses thermally reversible polymers containing nitroxide functional groups. It relates to the preparation of branched or crosslinked resins by the heat treatment of a polymer in the presence of a polynitroxide and, if necessary, a free-radical initiator, so as to obtain a resin having the property of thermal reversibility. The starting polymer may be a rubber or a thermoplastic polymer. The resins obtained offer processing conditions similar to those of the starting polymers, while having improved mechanical properties.

Patent U.S. Pat. No. 5,049,626 discloses a polyamide block graft copolymer obtained by the reaction (i) of a backbone which is a terpolymer of ethylene, an alkyl acrylate or a vinyl ester, and carbon monoxide with (ii) a monoamine-terminated polyamide of mass $\overline{M}_n$ of between 600 and 10 000 and preferably between 600 and 4000. This copolymer may optionally be blended with a tackifying resin.

Patent GB 2 262 939 discloses a polyamide-block graft copolymer obtained by the reaction (i) of a backbone which is an ethylene/acrylic acid copolymer with (ii) a monoamine-terminated amorphous polyamide. This copolymer is used as it is to coat steel sheet.

Patent EP 1 036 817 discloses a polyamide-block graft copolymer obtained by the reaction (i) of a backbone which is a copolymer of ethylene, propylene and, optionally, another α-olefin on which maleic anhydride has been grafted with (ii) a polyamide of mass $\overline{M}_n$ of between 3000 and 30 000 and preferably between 5000 and 20 000. This copolymer is then dissolved in toluene and this solution is sprayed onto polypropylene sheets.

Patent JP 60184579 A1 describes a polyamide (nylon-6)-block graft copolymer obtained by the reaction (i) of a backbone which is an ethylene/vinyl ester copolymer onto which maleic anhydride has been grafted with (ii) a nylon-6. This copolymer is then blended with a tackifying resin.

Patent EP 455 412 discloses a polyamide (nylon-6)-block graft copolymer obtained by the reaction (i) of a backbone which is a terpolymer of ethylene, an alkyl acrylate and a monomer (m) capable of reacting with an amine functional group with (ii) a monoamine-terminated nylon-6 of mass $\overline{M}_n$ of between 1000 and 3000. An additional condition is that, after attaching the PA-6 to the backbone, there remains on the said backbone at least 0.02 mol of (m) which has not reacted per 100 g of backbone. Another condition is that the MFI (Melt Flow Index) of the terpolymer before grafting be greater than or equal to 500 (g/10 min at 190° C. under a load of 2.16 kg). The PA-6 grafts have a melting point of about 205° C. The MFI at 190° C. of this polyamide-block copolymer cannot be measured because of the very high viscosity—it is necessary to blend it with a plasticizer in order to make an adhesive therefrom.

SUMMARY OF THE INVENTION

Hot-melt adhesives have now been found which are based on a polyamide-block graft copolymer obtained by the reaction (i) or a backbone made of a polyolefin containing a monomer capable of reacting with an amine functional group with (ii) a monoamine-terminated polyamide or mass $\overline{M}_n$ of between 1000 and 5000, the said graft copolymer having an MFI of between 1 and 500 (g/10 min at 190° C. under a load of 2.16 kg).

The present invention relates to a hot-melt adhesive composition comprising:
20 to 80% of a blend comprising:
  50 to 100% of (A), which denotes a polyamide-block graft copolymer consisting of a polyolefin backbone and at least one polyamide graft,
  0 to 50% of at least one polymer (B) chosen from polyolefins and polyamides;
80 to 20% of a blend comprising at least one tackifying resin and optionally at least one product chosen from waxes, plasticizers and mineral fillers; in which:
the said graft is attached to the backbone via the residues of an unsaturated monomer (X) chosen from unsaturated carboxylic acids, anhydrides of unsaturated carboxylic acids and unsaturated epoxides;
the residues of the unsaturated monomer (X) are attached to the backbone by grafting or copolymerization from its double bond;

the molar mass $\overline{M}_n$ of the grafts is between 1000 and 5000;

the melting point of the grafts is between 100 and 190° C.; and the MFI of (A) is between 1 and 500 (g/10 min at 190° C. under a load of 2.16 kg).

This composition has many advantages:

it is processed at the usual temperatures for hot-melt adhesives, that is to say around 180° C.; it is not necessary, after application, to wait for crosslinking;

it is simpler to use than two-component adhesives such as epoxy adhesives in which a hardener is necessary; and it has a markedly improved shear adhesive failure temperature (SAFT) compared with crosslinkable hot-melt adhesives.

These polyamide-block graft copolymers are organized in a structure on the nanometric scale, giving them exceptional thermomechanical resistance properties.

With regard to the polyamide-block graft copolymer (A), this may be obtained by reacting a polyamide having an amine terminal group with the residues of an unsaturated monomer X attached by grafting or copolymerization to a polyolefin backbone.

This monomer X may, for example, be an unsaturated epoxide, an unsaturated carboxylic acid such as (meth) acrylic acid or one of its salts or an anhydride of an unsaturated carboxylic acid or even a semiester of an anhydride of an unsaturated carboxylic acid. The anhydride of an unsaturated carboxylic acid may be chosen, for example, from maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methyl-bicyclo[2.2.1]hept-5-ene-2,2-dicarboxylic anhydrides. Advantageously, maleic anhydride is used. It would not be outside the scope of the invention to replace all or part of the anhydride with an unsaturated carboxylic acid such as, for example, (meth)acrylic acid. Likewise the anhydride may be partially hydrolysed. Examples of unsaturated epoxides are especially:

aliphatic glycidyl esters and ethers such as allyl glycidyl ether, vinyl glycidyl ether, glycidyl maleate, glycidyl itaconate, glycidyl acrylate and glycidyl methacrylate; and alicyclic glycidyl esters and ethers, such as 2-cyclohex-1-ene glycidyl ether, diglycidyl cyclohexene-4-5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate, With regard to the polyolefin backbone, a polyolefin is defined as a homopolymer or an alpha-olefin or diolefin copolymer, such as, for example, ethylene, propylene, 1-butene, 1-octene and butadiene. By way of example, mention may be made of:

ethylene homopolymers and copolymers, particularly LDPE, HDPE, LLDPE (linear low-density polyethylene), VLDPE (very low-density polyethylene) and metallocene polyethylene;

propylene homopolymers or copolymers;

ethylene/alpha-olefin copolymers, such as ethylene/propylene, EPR (ethylene-propylene-rubber) and ethylene/propylene/diene (EPDM);

styrene/ethylene-butylene/styrene (SEBS), styrene/butadiene/styrene (SBS), styrene/isoprene/styrene (SIS) and styrene/ethylene-propylene/styrene (SEPS) block copolymers;

copolymers or ethylene with at least one product chosen from salts or esters of unsaturated carboxylic acids, such as alkyl (meth)acrylate (for example methyl acrylate), or vinyl esters or saturated carboxylic acids such as vinyl acetate, the proportion of comonomer possibly being up to 40% by weight.

Advantageously, the polyolefin backbones to which the X residues are attached are polyethylenes grafted by X or ethylene/X copolymers which are obtained, for example, by radical polymerization.

The proportion of X is advantageously between 0.001 and 0.1 and preferably between 0.001 and 0.05 mol per 100 g of backbone polymer.

With regard to the polyethylenes to which X is grafted, polyethylene is understood to mean homopolymers or copolymers.

By way of comonomers, mention may be made of:

alpha-olefins, advantageously those having from 3 to 30 carbon atoms. Examples are mentioned above. These alpha-olefins may be used by themselves or as 2 mixture of two or more of them;

esters of unsaturated carboxylic acids such as, for example, alkyl (meth)acrylates, the alkyls possibly having up to 24 carbon atoms; examples of alkyl acrylate or methacrylate are, especially, methyl methacrylate, ethyl acrylate, n-butyl acrylate, isobutyl acrylate and 2-ethylhexyl acrylate;

vinyl esters of saturated carboxylic acids such as, for example, vinyl acetate or vinyl propionate;

dienes such as, for example, 1,4-hexadiene;

the polyethylene may comprise several of the above comonomers.

Advantageously, the polyethylene, which may be blend of several polymers, comprises at least 50% and preferably more than 75% (in mol) of ethylene and its (viscosity index at 190° C./2.16 kg) is advantageously density may be between 0.86 and 0.98 g/cm$^3$. The MFI between 5 and 2000 g/10 min.

By way of example of polyethylenes, mention may be made of:

low-density polyethylene (LDPE);

high-density polyethylene (HDPE);

linear low-density polyethylene (LLDPE);

very low-density polyethylene (VLDPE);

polyethylene obtained by metallocene catalysis;

EPR (ethylene-propylene-rubber) elastomers;

EPDM (ethylene-propylene-diene) elastomers;

blends of polyethylene with an EPR, or an EPDM;

ethylene/alkyl (meth)acrylate copolymers possibly containing up to 60% and preferably 2 to 40%, by weight of (meth)acrylate.

The grafting is an operation known per se.

With regard to ethylene/X copolymers, that is to say those in which X is not grafted, these are copolymers of ethylene with X and optionally with another monomer which may be chosen from the comonomers that were mentioned above for the ethylene copolymers intended to be grafted.

Advantageously, ethylene/maleic anhydride and ethylene/alkyl (meth)acrylate/maleic anhydride (MAH) copolymers are used. These copolymers comprise from 0.1 to 10% by weight of maleic anhydride (i.e. about 0.001 to 0.1 mol of MAH per 100 g of copolymer) and advantageously from 1 to 5% by weight of MAH. They comprise from 0 to 50%, advantageously from 10 to 50% and preferably 15 to 35% by weight of alkyl (meth)acrylate, Their MFI between 10 and 2000 (190° C./2.16 kg) advantageously between 60 and 1000. The alkyl (meth)acrylates have already been described above. The melting point is between 60 and 100° C.

With regard to the amine-terminated polyamide: Advantageously the constituents of the graft and their proportions are chosen so that the melting point of the graft is between 100 and 190° C. and preferably between 140 and 160° C. The proportion of grafts may be between 10 and 50% by weight of (A), that is to say of the sum of the backbone and the grafts. Preferably, this proportion is between 15 and 35%.

The term "homopolyamide" is understood to mean products resulting from the condensation of a lactam (or of the corresponding amino acid) or of a diacid with a diamine (or their salts); no account is taken of the chain stopper which may be a diacid or a diamine in the case of lactams and another diacid or another diamine in the case of polyamides resulting from the condensation of a diamine with a diacid. The term "copolyamide" is understood to mean the above products in which there is at least one more monomer than necessary, for example two lactams or one diamine and two acids, or else one diamine, one diacid and one lactam. The grafts may be PA 11 or PA 12 provided that the melting points are within the specified range. Advantageously, these are copolyamides.

According to a first type, the copolyamides result from the condensation of at least two α, Ω-aminocarboxylic acids or of at least two lactams having from 6 to 12 carbon atoms or of a lactam and of an aminocarboxylic acid not having the same number of carbon atoms. The copolyamides of this first tape may also include units which are residues of diamines and dicarboxylic acids.

As examples of dicarboxylic acids, mention may be made of diacids such as isophthalic, terephthalic, adipic azelaic, suberic, sebacic, nonanedioic and dodecanedioic acids.

As examples of diamines, mention may be made of hexamethylenediamine, dodecamethylenediamine, metaxylylenediamine, bis-p-aminocyclohexylmethane and trimethylhexamethylenediamine.

As examples of α,Ω-aminocarboxylic acids, mention may be made of aminocaproic acid, aminoundecanoic acid and aminododecanoic acid.

As examples of lactams, mention may be made of caprolactam, oenantholactam and lauryllactam (2-azacyclotridecanone).

According to a second type, the copolyamides result from the condensation of at least one α,Ω-aminocarboxylic acid (or a lactam), at least one diamine and at least one dicarboxylic acid. The α,Ω-aminocarboxylic acid, the lactam and the dicarboxylic acid may be chosen from those mentioned above. The diamine may be an aliphatic branched, linear or cyclic, or else arylic, diamine. As examples, mention may be made of hexamethylenediamine, piperazine, isophoronediamine (IPD), methylpentamethylenediamine (MPDM), bis (aminocyclohexyl)methane (BACM) and bis(3-methyl-4-aminocyclohexyl)methane (BMACM).

The processes for manufacturing copolyamides are known from the prior art and these copolyamides may be manufactured by polycondensation, for example in an autoclave.

The degree of polymerization may vary over wide proportions; depending on its value, the material is a copolyamide or a copolyamide oligomer. In the rest of the text, both expressions will be used for the grafts without distinction.

In order for the polyamide to have a monoamine terminal group, it is sufficient to use a chain stopper of formula:

in which:
R$_1$ is hydrogen or a linear or branched alkyl group containing up to 20 carbon atoms, R$_2$ is a linear or branched alkyl or alkenyl group having up to 20 carbon atoms, a saturated or unsaturated cycloaliphatic radical, an aromatic radical or a combination of the above. The chain stopper may, for example, be laurylamine or oleylamine.

Advantageously, the amine-terminated polyamide has a molar mass $\overline{M}_n$ of between 1500 and 3000 g/mol.

The preferred monofunctional polymerization stoppers are laurylamine and oleylamine. The polycondensation defined above is carried out as in the usual known processes, for example at a temperature generally between 200 and 300° C., under vacuum or under an inert atmosphere, and with the reaction mixture being stirred. The average chain length of the oligomer is determined by the initial molar ratio of the polycondensable monomer or lactam to the monofunctional polymerization stopper. In order to calculate the average chain length, it is usual to count one chain stopper molecule per oligomer chain.

The addition of the monoaminated copolyamide oligomer to the polyolefin backbone containing X is carried cut by reacting an amine functional group of the oligomer with X. Advantageously, X carries an anhydride or acid functional group; thus, amide, or amide links are created.

The addition of the amine-terminated oligomer to the polyolefin backbone containing X is preferably carried out in the melt. Thus, it is possible, in an extruder, to mix the oligomer and the backbone at a temperature generally of between 180 and 250° C. The average residence time of the melt in the extruder may be between 15 seconds and 5 minutes, and preferably between 1 and 3 minutes. The efficiency of this addition is evaluated by selectively extracting the free copolyamide oligomers, that is to say those which have not reacted to form the final polyamide-block graft copolymer.

The preparation of such amine-terminated copolyamides, and their addition to a polyolefin backbone containing X, is described in patents U.S. Pat. Nos. 3,976,720, 3,963,799, 5,342,886 and FR 2 291 225.

As examples of grafts, mention may be made (only the essential monomers and not the monoamine chain stopper will be mentioned):

the 6/11 copolyamide resulting from the condensation of caprolactam and aminoundecanoic acid, it being possible for the proportion of caprolactam units to be between 15 and 60% by weight and advantageously between 30 and 55% by weight;

the 6/12 copolyamide resulting from the condensation of caprolactam and lauryllactam, it being possible for the proportion of caprolactam units to be between 0 and 100% by weight and advantageously between 20 and 55% by weight;

the 6/11/12-6 copolyamide resulting from the condensation of caprolactam, aminoundecanoic acid, a C$_{12}$ diamine and adipic acid. The proportion of caprolactam may be between 20 and 70% by weight and advantageously between 30 and 60% by weight;

the 6-9/11 copolyamide resulting from the condensation of a C$_6$ diamine, a C$_9$ diacid and aminoundecanoic acid, it being possible for the proportion of aminoundecanoic acid to be between 30 and 80% by weight and advantageously between 40 and 60 by weight;

the 6-9/12 copolyamide resulting from the condensation of a $C_6$ diamine, a $C_9$ and lauryllactam, it being possible for the proportion of lauryllactam to be between 20 and 95% by weight and advantageously between 40 and 75% by weight, and the 6-6/11 copolyamide resulting from the condensation of a $C_6$ diamine, a $C_9$ diacid and aminoundecanoic acid, it being possible for the proportion of aminoundecanoic acid to be between 50 and 80b% by weight and advantageously between 55 and 65% by weight.

The MFI of (A) is advantageously between 1 and 100 and preferably between 5 and 30 (g/10 min at 190° C. under a load of 2.16 kg).

The polyamide-block graft copolymers of the present invention are characterized by a nanostructured organization with polyamide lamellae of between 10 and 50 nanometres in thickness.

With regard to the polymer (B), this is advantageously a polyolefin. Examples of polyolefins were mentioned above. Advantageously, (B) is chosen from ethylene/acrylate copolymers, ethylene/vinyl acetate copolymers and metallocene polyethylenes. Preferably, (B) is a copolymer of ethylene and an acrylate monomer (such as methyl acrylate, ethyl acrylate, butyl acrylate and 2-ethyl-hexyl acrylate) and/or vinyl acetate. In this case, the amount of vinyl acrylate so vinyl acetate comonomer will generally be from 10 to 45% by weight. It would not be outside the scope of the invention if the composition were to comprise several polymers (B).

The composition of the invention also includes at least one tackifying resin and optionally at least one product chosen from waxes, plasticizers and mineral fillers.

Tackifying resins which are suitable are, for example, collophony, collophony esters, hydrogenated collophony, polyterpenes and derivatives, aromatic or aliphatic petroleum resins and hydrogenated cyclic resins. These resins typically have a ring-and-ball softening point between 25° C. and 180° C. and preferably between 50° C. and 135° C.

Other examples of collophony derivatives are described in ULLMAN'S ENCYCLOPEDIA OF INDUSTRIAL CHEMISTRY, $5^{th}$ Edition, vol. A, 23, pp 79–66, the content being incorporated into the present application.

As collophany derivatives, mention may be made of those obtained by hydrogenation, dehydrogenation, polymerization and esterification. These derivatives may be used as such or in the form of polyol esters such as pentaerythritol, polyethylene glycol and glycerol esters. As tackifying resins, mention may also be made of dicyclopentadienes.

The adhesives of the invention may contain waxes. The latter allow the fluidity, open time and setting time to be adjusted. The waxes may be recovered during refining or petroleum fractions. These are, for example, waxes essentially consisting of paraffinic hydrocarbons and containing sufficient quantities of branched, cyclic and aromatic hydrocarbons to be much less crystalline than paraffins. It is also possible to use synthetic waxes such as Fischer-Tropsch waxes. Advantageously, the paraffin waxes used in the adhesives of the invention have a melting point greater than 50° C. and preferably between 60° C. and 70°C.

The plasticizers that can be used in the adhesives of the invention are, for example, mineral, paraffinic, aromatic or naphthenic oils. They are essentially used to lower the viscosity and provide tack. As examples of plasticizers, mention may also be made of phthalates, azelates, adipates, tricresyl phosphate and polyesters.

The adhesives of the invention may contain fillers. As examples of fillers, mention may be made of silica, alumina, glass, glass beads, calcium carbonates, fibres and metal hydroxides. These fillers must not reduce the tack or the mechanical properties of the adhesive after it has been applied.

As regards the proportions of the various constituents, the proportion of the blend of (A) and (B) is advantageously from 25 to 50% and preferably from 30 to 40% per 75 to 50% and 70 to 60%, respectively, of the combination of tackifying resin, waxes, plasticizers and fillers.

The hot-melt adhesives of the invention are prepared by mixing its constituents in the melt (except for the mineral fillers, which remain solid) at temperatures between 130° C. and 200° C. until a homogeneous compound is obtained. The mixing time may be around 30 minutes to 3 hours. The usual devices for use with thermoplastics, such as extruders, two-roll mills, Banbury or Brabender mixers or screw mixers, may be used.

The compounds or the invention may also include processing aids such as silica, ethylene bis(stearamide), calcium stearate or magnesium stearate. They may also include antioxidants, UV stabilizers and pigments or coloration.

The copolymer (A) may be manufactured first, and then mixed with the other ingredients of the composition of the invention. This is what the proceeding paragraphs have described.

(A) may also be manufactured while it is being mixed with the other ingredients (tackifying resin, wax, plasticizer, filter, stabilizer, etc.) of the adhesive composition, in which case the copolyamide grafts are attached in situ during the preparation of the final adhesive composition. The compositions of the invention may, for example, be prepared in one step in an extruder. The backbone containing X (for example an ethylene/alkyl (meth) acrylate/maleic anhydride copolymer) and the amine-terminated copolyamide are introduced into the first zones and then the optional polymer (B) and the other constituents, such as the tackifying resin, etc., are introduced a few zones further downstream. It is also possible to introduce all the ingredients, which have been dry-blended beforehand, into the first zone of the extruder.

In the following examples, the SAFT test is used, this being a test which measures the maximum temperature withstood by a bonded joint under a given static load. The test is carried out as follows:

Some adhesive is deposited at about 150° C. on a first cardboard test piece having dimensions of 150×25 mm and then immediately afterwards a second test piece identical to the first is applied. The bonding area thus obtained is 25×25=625 $mm^2$. The test pieces are left to cool down for a minimum of 4 h in an environmentally controlled room at 23° C. with 50% relative humidity.

The bonded joint is then suspended vertically in an oven from the first test piece, the second test piece being loaded with a mass of 500 g, and then subjected to a temperature rise from 25° C. to 200° C. at a rate of 0.4° C./min. The SAFT (shear adhesive failure temperature) withstand is the temperature at which the joint fails (the test pieces separate from one another).

The entire disclosure of all applications, patents and publications, cited herein and of corresponding French application No. 02.02394, filed Feb. 26, 2002 is incorporated by reference herein.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Example 1

An ethylene terpolymer, having a flexural modulus of 30 MPa, a weight-average molar mass $\overline{M}_w$ of 50 000 g/mol, comprising ethylene copolymerized with 20% by weight of ethyl acrylate and 3% by weight of maleic anhydride and having a melt flow index (MFI) of 70 g/10 min (at 2.16 kg/190° C.), was mixed in a Leistritz® corotating twin-screw extrudes provided with several mixing zones, having a temperature profile between 180 and 200° C., with a monoamine-terminated poly(caprolactam-co-lauryllactam) (coPA-6/12) of 2950 g/mol molecular mass, synthesized as in the method described in Patent U.S. Pat. No. 5,342,986. The terpolmer contained on average 0.029 mol/100 g of maleic anhydride. The 6/12 mono-$NH_2$ copolyamide had a composition by weight of 40/60 and a melting point of 133° C. The enthalpy of melting was 40 J/g. The proportions introduced into the extruder were such that the backbone polyolefin/amine-terminated copolyamide ratio was 80/20 by weight.

The product thus produced was analysed by transmission electron microscopy, revealing the polyamide phase by a treatment consisting in making ultrafine sections and then treating them in an aqueous solution of phosphotungstic acid or 30 min at 60° C.; the PA appeared dark. The morphology was on a nanometric and lamellar or cocontinuous scale— the copolyamide lamellae (10–20 nm) were connected, resulting in the excellent thermomechanical properties. This grafted copolymer had a SAFT of 136° C. and it withstood a stress of 0.05 N/mm for at least 15 mm (elongation=3%). Thanks to the melting point, the viscosity was low—the product had an MFI of 9 g/10 min (190° C./2.16 kg). The flexural modulus was 95 MPa.

Example 2

The terpolymer was the same as in Example 1. The copolyamide was also terminated with one $NH_2$ functional group per chain, but was a caprolactam (6)/amino-undecyl acid (11) copolymer with a 55/45 composition and a melting point of 143° C.; the enthalpy of melting was low, namely 27 J/g, and its mass was 2250 g/mol. After reaction in the extruder, as described in Example 1 (composition consisting of 80/20 terpolymer/copolyamide by mass), the graft copolymer obtained had the following properties: the morphology was on a nanometric and lamellar or cocontinuous scale—the copolyamide lamellae (10–20 nm) were connected. Despite the mediocre thermomechanical properties, the graft copolymer had a SAFT of 154° C. The product did not withstand a stress of 0.05 N/cm at 120° C., probably owing to the low degree of crystallinity. The viscosity was low thanks to the melting point—the product had an MFI of 10 g/10 min (190° C./2.16 kg).

Example 3

The terpolymer used was the same as in Example 1. The copolyamide was also terminated with one $Nh_2$ functional group per chain, but it was a caprolactam (6)/lauryllactam (12) copolymer with a 20/80 composition and a melting point of 155° C.; the enthalpy of melting was 58 J/g and its mass was 2790 g/mol. After reaction in the extruder as described in Example 1 (composition containing 80/20 terpolymer/copolyamide by mass), a graft copolymer was obtained with the following properties: the morphology was on a nanometric and lamellar or cocontinuous scale—the copolyamide lamellae (10–20 nm) were connected, resulting in the excellent thermomechanical properties. The graft copolymer had a SAFT of 145° C. and it withstood a stress of 0.05 N/mm for at least 15 min. It had an MFI of 20 g/10 min (190° C./2.16 kg).

Example 4 (Comparative Example)

The terpolymer used was the same as in Example 1. The copolyamide was also terminated with one $NH_2$ functional group per chain, but it was a PA-6 homopolymer. It therefore had a melting point of 213° C.; its enthalpy of melting was 70 J/g and its molecular mass was 2440 g/mol. After reaction in the extruder as described in Example 1 (composition consisting of 80/20 terpolymer/polyamide by mass), a graft copolymer was obtained with the following properties: the morphology was on a nanometric and lamellar or cocontinuous scale—the copolyamide lamellae (10–20 nm) were connected, resulting in the excellent thermomechanical properties. The product withstood a stress of 0.05 N/mm for at least 15 min (1% elongation). Owing to the high melting point of the graft, the product was very viscous and the MFI could not be measured at 190° C./2.16 kg. The product had an MFI of 27 g/10 min at 230° C./2.16 kg.

Examples 5–13

Hot-Melt Formulations.

The polyamide-block graft copolymers of Examples 1–4 were evaluated in hot-melt formulation for wood applications. Table 1 below gives the various formulations produced, together with their main characteristics.

The Brookfield is viscosity is expressed. In mPa.s (it was measured with a 29 rotor); the temperature and the speed in revolutions per minute (rpm) are specified. The raw materials used in the formulations are the following:

Novares® TN150 (Rütgers VFT) denotes a tackifying resin of the hydrocarbon type;

Dertopoline® P125 (DRT) denotes a tackifying resin of the collophony ester type;

Irganox® 1010 (Ciba-Geigy) is an antioxidant;

Lotryl® 28BA175 (Atofina) denotes an ethylene/butyl acrylate copolymer containing 28% by weight of acrylate and having an MFI of 175 (in g/10 min at 190° C. under a load of 2.16 kg according to ASTM D 1238) and a Tg of 80° C.

TABLE 1

| Composition | Ex. 5 | Ex. 6 | Ex. 7 | Ex. 8 (comparative example) | Control |
|---|---|---|---|---|---|
| (A) (Example 2) | 40 | | | | Hot-melt based on EVA (ethylene/vinyl acetate copolymer containing 28% by weight of acetate) |
| (A) (Example 1) | | 40 | | | |
| (A) (Example 3) | | | 40 | | |
| (A) (Example 4) | | | | 40 | |
| Novarès TN150 | 15 | 15 | 15 | 15 | |
| Dertopoline P125 | 15 | 15 | 15 | 15 | |
| Ca carbonate | 30 | 30 | 30 | 30 | |
| Irganox 1010 | 0.5 | 0.5 | 0.5 | 0.5 | |
| Brookfield viscosity (mPa · s, Rotor 29, | | | | | |
| 220° C., speed: 1 rpm | 534 000 | 534 000 | 595 000 | Not measurable | 156 000 (speed: 5 rpm) |
| 200° C., speed: 1 rpm | not measurable | not measurable | not measurable | Not measurable | 325 000 (speed: 2.5 rpm) |
| Ring-and-ball softening point (° C.) | 189 | 188 | 186 | >190 | 151 |
| SAFT (° C.) | 145 | 134 | 146 | >150 | 100 |

Very good temperature withstand (SAFT) properties may be seen, but the viscosities are too high to allow correct industrial application of this type of hotmelt. Trials were therefore carried out by blending with higher MFI copolymers so as to lower the viscosity of the final compound.

| Composition | Ex. 9 | Ex. 10 | Ex. 11 | Ex. 12 | Ex. 13 |
|---|---|---|---|---|---|
| (A) (Example 3) | 32 | 24 | 20 | 30 | 24 |
| Lotryl 28BA175 | 8 | 16 | 20 | | 8 |
| Novarès TN150 | 15 | 15 | 15 | 20 | 20 |
| Dertopoline P125 | 15 | 15 | 15 | 20 | 20 |
| Ca carbonate | 30 | 30 | 30 | 30 | 30 |
| Irganox 1010 | 0.5 | 0.5 | 0.5 | 0.5 | 0.5 |
| Brookfield viscosity (mPa · s, Rotor 29, | | | | | |
| 220° C., speed: 5 rpm | 158 000 | 126 000 | 102 000 | 140 000 | 120 000 |
| 200° C., speed: 2.5 rpm | not measurable | not measurable | not measurable | not measurable | 290 000 |
| Ring-and-ball softening point (° C.) | 170 | 161 | 156 | 165 | 160 |
| SAFT (° C.) | 145 | 117 | 113 | 135 | 132 |

It should be noted that it is advantageous not to dilute with another ploymer by more than 50% as a significant drop in the temperature withstand properties of the adhesive is observed.
Another solution consisted in reducing the overall amount of polymer in the formulation and it has been noticed that, with polymer contents of around 30%, it is possible to retain good temperature withstand properties of the adhesive.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A hot-melt adhesive composition comprising:
   20 to 80% by weight, based on the total composition, of a blend comprising:
      50 to 100% by weight, based on the blend, of a component (A) comprising a polyamide graft copolymer having a polyolefin backbone and at least one polyamide graft, and
      0 to 50% by weight, based on the blend, of at least one polymer (B) selected from polyolefin and polyamide polymers; and
   80 to 20% by weight, based on the total composition, of at least one tackifying resin, which is optionally blended with at least one wax, plasticizer or mineral filler;

wherein:
   the polyamide graft in component (A) is attached to the polyolefin backbone via residues of an unsaturated monomer, (X), selected from unsaturated carboxylic acids, anhydrides of unsaturated carboxylic acids and unsaturated epoxides;
   the residues of the unsaturated monomer, (X), are attached to the backbone by grafting or copolymerization from the unsaturated bond;
   the molar mass, $M_n$, of the polyamide graft is between 1000 and 5000;
   the melting point of the polyamide graft is between 100 and 190° C.; and
   the MFI of component (A) is between 1 and 500 g/10 mm at 190° C. under a load of 2.16 kg.

2. The composition of claim 1, wherein the proportion of unsatured monomer, (X), for attaching the polyamide graft is between 0.001 and 0.1 mol per 100 g of the polyolefin backbone.

3. The composition of claim 1, wherein the proportion of unsatured monomer, (X), for attaching the polyamide graft is between 0.001 and 0.05 mol per 100 g of the polyolefin backbone.

4. The composition of claim 1, wherein the polyolefin backbone is an ethylene/alkyl(meth)acrylate/maleic anhydride (MAH) copolymer or an ethylene/maleic anhydride (MAH) copolymer.

5. The composition of claim 4, wherein the polyolefin backbone comprises from 0.1 to 10% by weight of maleic anhydride.

6. The composition of claim 4, wherein the copolymer for the polyolefin backbone contains from above 0% to 50% by weight of alkyl(meth)acrylate.

7. The composition of claim 4, wherein the copolymer for the polyolefin backbone contains 10 to 50% by weight of alkyl(meth)acrylate.

8. The composition of claim 4, wherein the copolymer for the polyolefin backbone contains 15 to 35% by weight of alkyl(meth)acrylate.

9. The composition of claim 4, wherein the MFI of the polyolefin backbone is between 10 and 2000 g/10 mm at 190° C. under a load of 2.16 kg.

10. The composition of claim 4, wherein the MFI of the polyolefin backbone is between 60 and 1000 g/10 mm at 190° C. under a load of 2.16 kg.

11. The composition of claim 1, wherein the melting point of the polyamide graft is between 140 and 160° C.

12. The composition of claim 1, wherein the proportion of polyamide graft is between 10 and 50% by weight of the total weight of the graft copolymer of component (A).

13. The composition of claim 1, wherein the proportion of polyamide graft is between 15 and 35% by weight of the total weight of the graft copolymer of component (A).

14. The composition of claim 1, wherein the MFI of component (A) is between 1 and 100 g/10 mm at 190° C. under a load of 2.16 kg.

15. The composition of claim 1, wherein the MFI of component (A) is between 5 and 30 g/10 mm at 190° C. under a load of 2.16 kg.

16. The composition of claim 1, wherein the proportion of the blend of (A) and (B) in the composition is from 25 to 50% by weight and the proportion of the at least one tackifying resin optionally blended with at least one wax, plasticizer or mineral filler in the composition is 75 to 50% by weight.

17. The composition of claim 1, wherein the proportion of the blend of (A) and (B) in the composition is from 30 to 40% by weight and the proportion of the at least one tackifying resin optionally blended with at least one wax, plasticizer or mineral filler in the composition is 70 to 60% by weight.

18. The composition of claim 1, wherein the polyolefin contains at least 50% by weight of ethylene.

19. The composition of claim 1, wherein the amount of polymer (B) is more than 0%.

20. The composition of claim 19, wherein the polymer (B) is selected from ethylene/acrylate copolymers, ethylene/vinyl acetate copolymers and metallocene polyethylenes.

21. The composition of claim 1, wherein the tackifying resin is selected from collophony, collophony esters, hydrogenated collophony, polyterpenes, aromatic or aliphatic petroleum resins, hydrogenated cyclic resins and dicyclopentadienes.

22. The composition of claim 1, wherein the tackifying resin has a ring-and-ball softening point between 25° C. and 180° C.

23. The composition of claim 1, wherein the tackifying resin has a ring-and-ball softening point between 50° C. and 135° C.

* * * * *

UNITED STATES PATENT AND TRADEMARK OFFICE
CERTIFICATE OF CORRECTION

PATENT NO. : 6,846,874 B2
DATED : January 25, 2005
INVENTOR(S) : Martin Baumert et al.

It is certified that error appears in the above-identified patent and that said Letters Patent is hereby corrected as shown below:

Column 12,
Line 57, reads "mm" should read -- min --

Column 13,
Lines 16, 19, 30 and 33, reads, "mm" should read -- min --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,846,874 B2
DATED : January 25, 2005
INVENTOR(S) : Martin Baumert

It is certified that error appears in the above-identified patent and that said Letters Patent is hereby corrected as shown below:

Column 43,
Line 17, reads "X'", should read -- $X^0$ --.

Column 44,
Line 20, after "F", insert -- C1 --.

Signed and Sealed this

Sixth Day of September, 2005

JON W. DUDAS
*Director of the United States Patent and Trademark Office*